Figure 1:
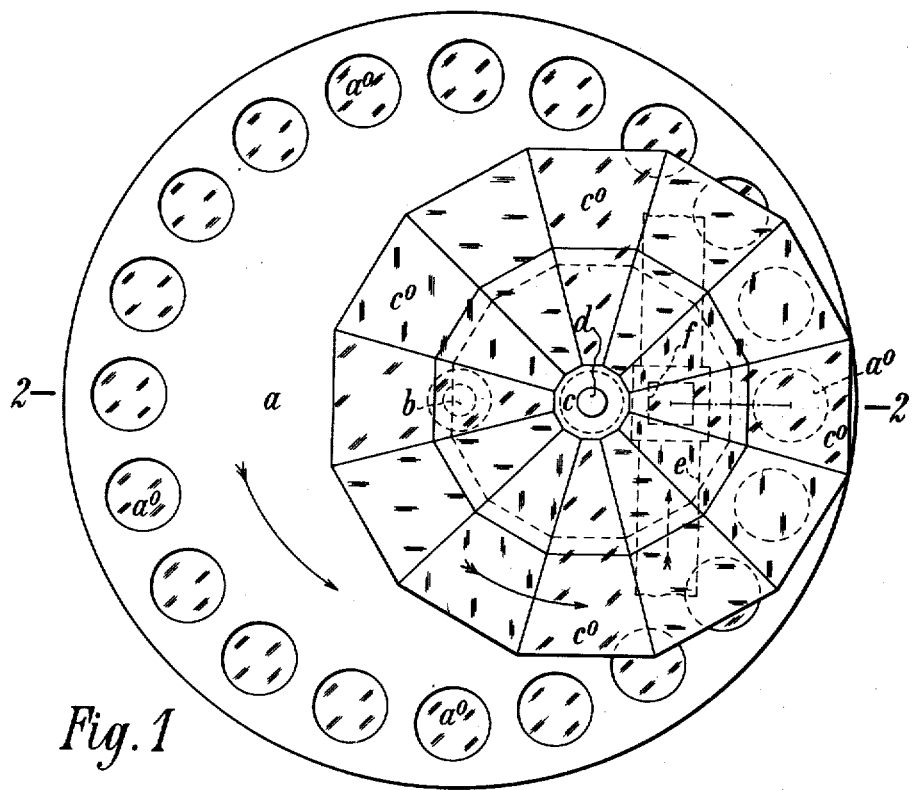

Jan. 30, 1923.                                                      1,443,672
W. BAUERSFELD.
CINEMATOGRAPHIC APPARATUS.
FILED AUG. 13, 1921.                                        2 SHEETS-SHEET 1

Inventor:
Walther Bauersfeld

Jan. 30, 1923.  
W. BAUERSFELD.  
CINEMATOGRAPHIC APPARATUS.  
FILED AUG. 13, 1921.  
1,443,672  
2 SHEETS-SHEET 2

Inventor:  
Walter Bauersfeld.

Patented Jan. 30, 1923.

1,443,672

UNITED STATES PATENT OFFICE.

WALTHER BAUERSFELD, OF JENA, GERMANY, ASSIGNOR TO THE FIRM OF CARL ZEISS, OF JENA, GERMANY.

CINEMATOGRAPHIC APPARATUS.

Application filed August 13, 1921. Serial No. 492,130.

(GRANTED UNDER THE PROVISIONS OF THE ACT OF MARCH 3, 1921, 41 STAT. L., 1313.)

*To all whom it may concern:*

Be it known that I, WALTHER BAUERSFELD, a citizen of the German Empire, residing at Jena, Germany, have invented a new and useful Cinematographic Apparatus (for which I have filed an application in Germany, March 17, 1919; Switzerland, May 19, 1920, Patent No. 89256; Austria, May 26, 1920; England, June 26, 1920, Patent No. 146210; Italy, July 10, 1920; and France, September 18, 1920), of which the following is a specification.

The present invention relates to a device for the optical compensation of the movement of the film for use in a cinematographic apparatus for projection or for taking photograms having a uniformly traversed film, which device contains rotatable and controlled by the film actuating means a ring of objectives, the axes of which are parallel to the axis of rotation of the ring. The employment of such a ring of objectives has been proposed for the purpose of avoiding the mechanical difficulties which arise when employing a band of objectives moving parallel to the film. However, whilst the use of such a band of objectives, when several film-pictures are projected simultaneously, involves but a very slight displacement of the pictures produced on the screen (viz, one equal to the pitch of the objectives), the said displacement becomes considerable when employing a ring of objectives, it being the greater, the more the circular path of the centres of the objectives deviates from the rectilinear path of the centres of the film-pictures. However, according to the invention it may be reduced to an amount approximately as small as that resulting when a band of objectives is employed, which end is attained by optically transforming the rectilinear path of the centres of the film-pictures during their passage through the field of the rays into a path which to all intents and purposes is with sufficient accuracy circular, and coincides with the path of the centres of the objectives. For this purpose between the ring of objectives and the film a ring of rhombic prisms, or central reflectors, is disposed, also rotatable and controlled by the film actuating means, the surfaces of entrance and emergence of which prisms or reflectors are perpendicular to the axis of rotation of the ring, the said axis of rotation being parallel to that of the ring of objectives.

Figure 2:
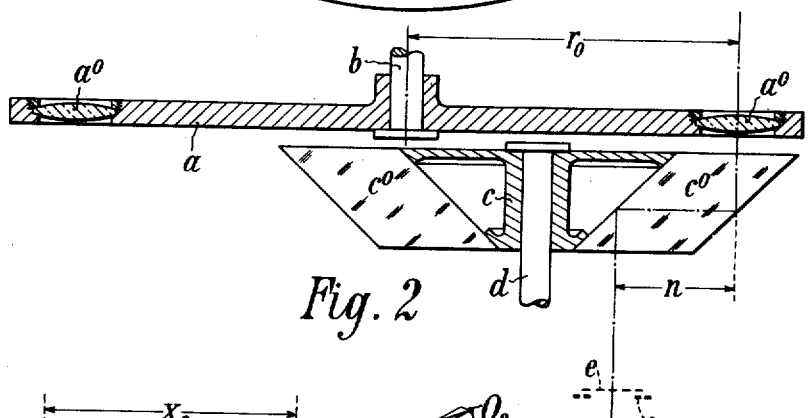
Figure 3:
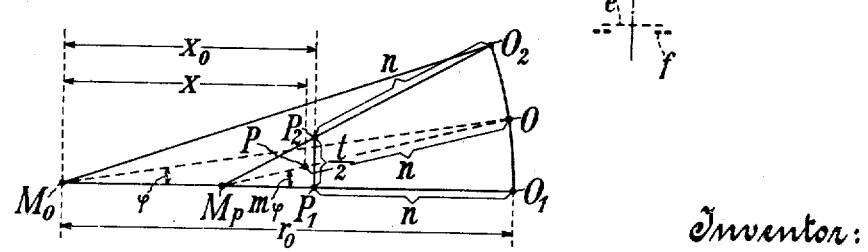
Figure 4:
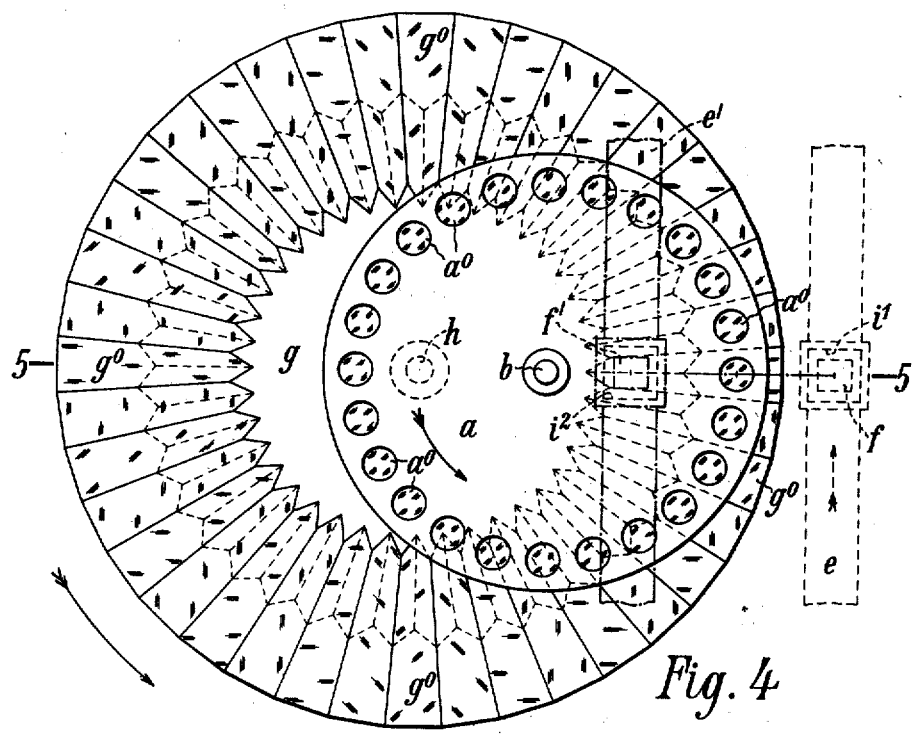
Figure 5:
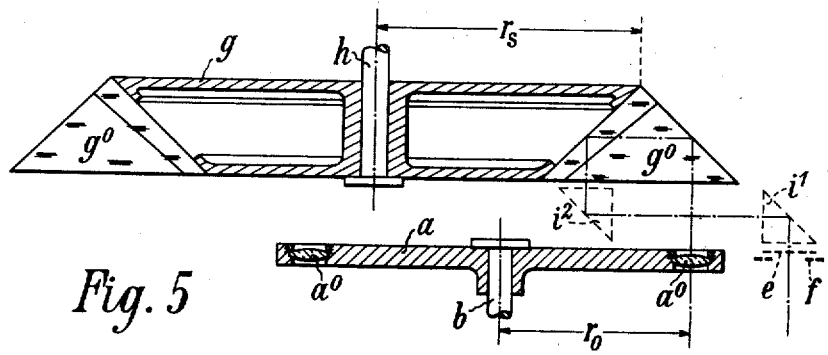
Figure 6:
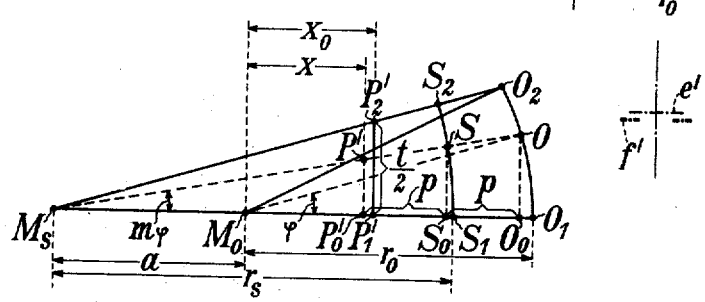

In the annexed drawings: Figs. 1 and 2 show a view in elevation and a section in plan respectively of a constructional example of the invention in which between the ring of objectives and the film a ring of rhombic prisms is disposed. Fig. 3 shows diagrammatically (by way of a projection on the film-plane) the transformation of the rectilinear path of the film-centre during its passage through the field of the rays into a well-nigh circular path by means of rhombic prisms. Figs. 4 and 5 show a front view in elevation and a section in plan respectively of a second constructional example of the invention in which between the ring of objectives and the film a ring of central reflectors is introduced into the path of the rays. Fig. 6 shows diagrammatically (by way of a projection on the plane of the reflected image of the film) the transformation of the rectilinear path of the film-centre during its passage through the field of the rays into a well-nigh circular path by means of central reflectors.

In Figs. 1 and 2 the ring $a$, the shaft $b$ of which is rotatably disposed, contains at its periphery 20 evenly distributed objectives $a^o$, the axes of which are parallel to the shaft $b$. The ring $c$, the shaft $d$ of which is rotatably disposed in such a manner that it is parallel to the shaft $b$ of the objective-ring $a$, contains 12 rhombic prisms $c^o$ contiguous to one another; the surfaces of entrance and emergence of which are perpendicular to the shaft $d$. The film is marked $e$, and the film gate $f$. The respective direction of travel of the two rings and of the film is indicated by arrows. The rings are to be supposed to be coupled with the actuating mechanism of the film in such a manner that a like number of prisms, of objectives and of film-pictures move through the field of the rays in like spaces of time. Besides the following lettering has been adopted $r_o$ is the distance from the axes of the objectives to the shaft $b$, and $n$ is the displacement which is imparted to a ray entering a rhombic prism perpendicularly to the surface of entrance of the said prism.

The respective value of $r_0$ and $n$ is determined by the condition, that the rectilinear path of the film-centre during its passage through the field of the rays becomes by means of the rhombic prisms transformed into a path, which is for all practical purposes with sufficient accuracy circular, and coincides with the path of the centres of the objectives. In Fig. 3 of the drawing $M_o$ denotes the axis of the ring of objectives, and $M_p$ the axis of the ring of prisms. $P_1$ lying in the centre of the field of the rays (hence coinciding with the centre of the film gate denotes the centre of a film-picture, which centre by means of a rhombic prism becomes displaced in the direction of a diameter of the ring of prisms by the amount $n$, and imaged in the centre $O_1$ of an objective. When travelling from the centre to the margin of the field of the rays, the film-centre $P_1$, covers the distance $\frac{t}{2}$ (half the pitch of the film), and reaches $P_2$. In the same time the objective-centre reaches $O_2$. In order to attain that also at the margin of the filed of the rays the image of the film-centre $P_2$ is formed in the objective-centre $O_2$, it is necessary that $P_2O_2$ (as well as $P_1O_1$) be equal to $n$. From this requirement there result for the calculation of the values $r_0$ and $n$ the approximate equations:

$$r_0 = \frac{t}{2\pi} \cdot \frac{Z_o^2}{Z_o - Z_p},$$

$$n = \frac{t}{2\pi} \cdot \frac{Z_p^2}{Z_o - Z_p},$$

wherein $Z_o$ denotes the number of objectives, and $Z_p$ the number of prisms. If the objective-centre be situated in any desired place $O$ of the field of rays, if, therefore, the objective-ring has been turned out of that position in which the objective-centre was situated in the centre of the field of rays (in $O_1$) through an angle $\varphi$, to which rotation there corresponds a rotation of the ring of prisms through the angle $m\varphi$, $m$ being equal to $\frac{Z_o}{Z_p}$, the film-point which becomes imaged in $O$ lies at $P$, $OP$ being equal in value to $n$, and inclined to $M_o M_p$ by the angle $m\varphi$. If, as it is desired, the film-centre travelling along the straight line $P_1P_2$ is to be imaged invariably in the objective-centre during its passage through the entire field of the rays, it is necessary that $P$ lies on the straight line $P_1P_2$. Supposing a rectangular system of coordinates be laid through $M_o$, the X-axis ($M_oO_1$) of which system is perpendicular to $P_1P_2$, then, as will be inferred from Fig. 3 of the drawing, the following equation holds good as regards the straight line $P_1P_2$ with respect to the said system of coordinates: $x_o = r_0 - n =$ constant. As a matter of fact, however, the points $P$ form a curve for which according to Fig. 3 of the drawing the following equation holds good:

$$x = r_0 \cos \varphi - n \cos m\varphi.$$

Taking into account the values for $r_0$ and $n$, as previously stated, and $m = \frac{Z_o}{Z_p}$, the following equation results:

$$x = \frac{t}{2\pi} \cdot \frac{1}{Z_o - Z_p} \left( Z_o^2 \cos \varphi - Z_p^2 \cos \frac{Z_o}{Z_p} \varphi \right).$$

If this latter equation $Z_o$ and $Z_p$ be replaced by their respective values: $Z_o = 20$, and $Z_p = 12$, in accordance with the appertaining first constructional example, the resulting values for $x$, within the limits $\varphi = 0$ and $\varphi \max. = \frac{\pi}{Z_o} = 9°$, will lie within the limits 95.993 mm. and 96.001 mm., whilst for $x_o$ there results the value 96 mm. Hence, the greatest distance of the various points $P$ from the straight line $P_1P_2$, and even the relative distance of the points $P$ which are situated farthest away to the left and right from the straight line $P_1P_2$, amounts to less than 1/100 mm., which may be considered to be negligible.

In Figs. 4 and 5 the lettering corresponds, as far as this is admissible, with that of the first example. The ring $a$ contains 24 objectives $a^o$, the axes of which are parallel to the axis of rotation $b$ of the ring. The ring $g$, shaft $h$ of which is rotatably disposed so as to be parallel to the axis $b$ of the objective-ring $a$, contains 40 central reflectors $g^o$ contiguous to one another, the surfaces of entrance and emergence of which are perpendicular to the shaft $h$. Between the film $e$ and the ring $g$ of the central reflector there are introduced into the path of the rays two simple stationary reflecting prisms $i^1$ and $i^2$, the reflecting surfaces of which are parallel to one another, and inclined to the surfaces of entrance and emergence of the central reflectors $g^o$ by 45°. The image of the film $e$ is marked $e'$, and the image of the film-gate $f$ with respect to the reflecting surface of the prism $i^2$ is marked $f'$. The respective direction of travel of the two rings and of the film is indicated by arrows. The rings are to be supposed to be coupled with the actuating mechanism of the film in such a manner that a like number of central reflectors, of objectives, and of film-pictures pass through the field of the rays in like spaces of time. Furthermore, the following lettering has been adopted: $r_0$ denotes the distance from each objective-axis to the axis $b$, and $r_s$ the distance from the corner of each central reflector to the shaft $h$.

The respective value of $r_0$ and $r_s$ is determined by the condition, that the rectilinear path of the film-centre during its passage through the field of the rays becomes by means of the central reflectors transformed into a path, which is for all practical purposes with sufficient accuracy circular, and coincides with the path of the centres of the objectives. In Fig. 6 of the drawing $M_o$ denotes the axis of the ring of objectives, and $M_s$ the axis of the ring of central reflectors. $P'_1$ lying in the centre of the field of the rays denotes the centre of a single picture of the reflected image $e'$, and becomes imaged by means of a central reflector in the centre $O_1$ of an objective. $S_1$ denotes the corner of the said central reflector, which corner, as is known, lies midway between $P'_1$ and $O_1$. When travelling from the centre to the margin of the field of the rays, the centre $P'_1$ of the film-picture covers the distance $\frac{t}{2}$ (half the pitch of the film), and reaches $P'_2$. In the same time the objective-centre $O_1$ reaches $O_2$, and the corner $S_1$ of the central reflector reaches $S_2$. In order to attain that also at the margin of the field of the rays the image of the centre $P'_2$ of the film-picture is formed in the objective-centre $O_2$, it is necessary that $P'_2 S_2$ be equal to $S_2 O_2$, and furthermore, that $P'_2$, $S_2$, and $O_2$ lie in a straight line. From this requirement there result for the calculation of the values $r_o$ and $r_s$ the approximate equations:

$$r_o = \frac{t}{2\pi} \cdot \frac{Z_s^2}{Z_s - Z_o},$$

$$r_s = \frac{t}{2\pi} \cdot \frac{\tfrac{1}{2} Z_o^2}{Z_s - Z_o},$$

wherein $Z_o$ denotes the number of objectives, and $Z_s$ the number of central reflectors. If the objective-centre be situated in any desired place $O$ of the field of the rays, if, therefore, the objective-ring has been turned out of that position in which the objective-centre was situated in the centre of the field of the rays (in $O_1$) through an angle $\varphi$, to which rotation there corresponds a rotation of the ring of central reflectors through an angle $m\varphi$, $m$ being equal to $\frac{Z_o}{Z_s}$, the film-point which becomes imaged in $O$ lies in the locus of $P'$, whilst the corner of the central reflector lies in the locus of $S$. Besides $P'$, $S$ and $O$ lie in a straight line which is inclined to $M_s M_o$ by the angle $m$ and the following equation holds good: $\overline{P'S} = \overline{SO}$. If, as it is desired, the film-center travelling along the straight line $P_1' P_2'$ is to be imaged invariably in the objective-centre during its passage through the entire field of the rays, it is necessary that $P'$ lies on the straight line $P_1' P_2'$. Supposing a rectangular system of coordinates be laid through $M_o$, the X axis ($M_o O_1$) of which system is perpendicular to $P_1' P_2'$, supposing further that lines parallel to the Y-axis of the said system of coordinates are drawn through $P'$, $S$ and $O$, which lines intersect the X-axis in $P_o'$, $S_o$ and $O_o$ respectively, $P_o'S_o$ being equal to $S_o O_o$, and the following lettering be adopted: $\overline{P_o' S_o} = \overline{S_o O_o} = p$, and $M_o M_s = a$, then, as will be inferred from Fig. 6 of the drawing, the following equation holds good as regards the straight line $P_1' P_2'$ with respect to the said system of coordinates:

$$x_o = r_o - \overline{P_1 O_1}.$$

In this equation $$\frac{\overline{P_1 O_1}}{2} = \overline{S_1 O_1} = r_o + a - r_s,$$

whereby $$a = \frac{t}{2\pi} Z_c.$$

Inserting the values thus obtained as well as the values for $r_o$ and $r_s$, as previously stated, in the said equation for $x_o$, there results the following equation $$x_o = \frac{t}{2\pi}(Z_s - Z_o)$$

As a matter of fact, however, the points $P$ form a curve, for which according to Fig. 6 of the drawing the following equation holds good:

$$x = r_o \cos \varphi - 2P.$$

In this equation $$p = r_o \cos \varphi + a - r_s \cos m\varphi.$$

Inserting the value thus obtained as well as the respective values for $r_o$, $r_s$, $a$, and $m$, as previously stated, in the equation for $x$, the following equation holds good:

$$x = \frac{t}{2\pi} \frac{1}{Z_s - Z_o} \left[ Z_o^2 \cos \frac{Z_o}{Z_s} \varphi - Z_o^2 \cos \varphi - 2Z_o(Z_s - Z_o) \right]$$

If in this latter equation $Z_o$ and $Z_s$ be replaced by their respective values: $Z_o = 24$, and $Z_s = 40$, in accordance with the appertaining second constructural example, the resulting values for $x$, within the limits $\varphi = o$ and $\varphi \max. = \frac{\pi}{Z_o} = 7.5°$, will lie within the limits 47.997 mm. and 48.008 mm., whilst for $x_o$ there results the value 48.000 mm. Hence, the greatest distance of the various points $P$ from the straight line $P_1' P_2'$ amounts to less than 1/100 mm. Even the relative distance of the points $P$ which are situated farthest away to the left and right from the straight line $P_1' P_2'$ hardly exceeds 1/100 mm. Those deviations may be considered to be negligible.

I claim:

1. In a device for the optical compensation of the movement of the film for use in a cinematographic apparatus having a uniformly traversed film, a ring of objectives rotatably disposed, the axes of which objectives being parallel to the axis of rotation of the ring of objectives, a ring of optical elements rotatable about an axis parallel to that of the ring of objectives, which ring of optical elements is to be disposed between the said ring of objectives and the film, whereby each of these optical elements is of such a kind as to be capable of displacing an entering ray parallelly to itself, these optical elements having, in addition, such a distance apart that their surfaces of entrance and emergence are perpendicular to the axis of rotation of the ring containing them and whereby the said ring of objectives and the ring of optical elements are destined to experience a rotary motion, depending on the film motion.

2. In a device for the optical compensation of the movement of the film for use in a cinematographic apparatus having a uniformly traversed film, a ring of objectives rotatably disposed, the axes of which objectives being parallel to the axis of rotation of the ring of objectives, a ring of rhombic prisms rotatable about an axis parallel to that of the ring of objectives, which ring of central reflectors is to be disposed between the said ring of objectives and the film, the surfaces of entrance and emergence of which rhombic prisms being perpendicular to the axis of rotation of the ring of prisms, whereby the said ring of objectives and the said ring of prisms are destined to experience a rotary motion, depending on the film motion.

WALTHER BAUERSFELD.

Witnesses:
PAUL KRÜGER,
RICHARD HAHN.